(12) United States Patent
Smith

(10) Patent No.: US 9,296,268 B2
(45) Date of Patent: Mar. 29, 2016

(54) SYSTEM AND METHOD FOR TIRE DEBRIS CONTAINMENT

(75) Inventor: Phillip N. Smith, Maud, TX (US)

(73) Assignee: CLIPPERDIDIT, INC., Maud, TX (US)

( * ) Notice: Subject to any disclaimer, the term of this patent is extended or adjusted under 35 U.S.C. 154(b) by 643 days.

(21) Appl. No.: 13/298,807

(22) Filed: Nov. 17, 2011

(65) Prior Publication Data

US 2012/0125518 A1    May 24, 2012

Related U.S. Application Data

(60) Provisional application No. 61/415,131, filed on Nov. 18, 2010.

(51) Int. Cl.
*B60C 27/14* (2006.01)

(52) U.S. Cl.
CPC .............. *B60C 27/145* (2013.01); *Y10T 156/10* (2015.01)

(58) Field of Classification Search
CPC ...... B60C 17/00; B60C 27/14; B60C 27/145; B60C 27/16; B60C 27/18
USPC ............... 29/404, 709, 802; 180/271, 84; 280/847, 848, 851, 855, 159, 160; 152/208, 213 R, 214, 215, 216
See application file for complete search history.

(56) References Cited

U.S. PATENT DOCUMENTS

| | | | | |
|---|---|---|---|---|
| 1,201,578 A | * | 10/1916 | Haberstick | 152/215 |
| 1,211,597 A | * | 1/1917 | Kress | 152/214 |
| 1,245,219 A | * | 11/1917 | Haberstick | 152/215 |
| 1,708,755 A | * | 4/1929 | Dierksmier | 242/395 |
| 1,818,004 A | * | 8/1931 | Nelsen | 152/214 |
| 2,746,507 A | * | 5/1956 | Morgan | 152/214 |
| 3,630,255 A | * | 12/1971 | Wonderley | 152/215 |
| 4,097,090 A | * | 6/1978 | Payne et al. | 298/1 SG |
| 5,582,431 A | * | 12/1996 | Anderson | 280/851 |
| 5,653,847 A | * | 8/1997 | King et al. | 156/421.6 |
| 5,967,554 A | * | 10/1999 | Rea | 280/851 |
| 6,263,996 B1 | * | 7/2001 | Welch | 180/271 |
| 7,165,658 B1 | * | 1/2007 | Kehoe | 188/4 R |
| 7,198,084 B2 | * | 4/2007 | Riemer et al. | 152/221 |
| 7,793,985 B1 | | 9/2010 | Coloma | |
| 8,171,967 B2 | * | 5/2012 | Rose | 152/175 |
| 8,397,772 B1 | * | 3/2013 | Faridoon | 152/185.1 |
| 2003/0184078 A1 | * | 10/2003 | Grable | 280/847 |
| 2004/0164539 A1 | * | 8/2004 | Bernard | 280/848 |
| 2009/0273176 A1 | * | 11/2009 | Ulgen | 280/851 |

FOREIGN PATENT DOCUMENTS

| | | |
|---|---|---|
| AT | 505619 A4 | 3/2009 |
| DE | 2652996 A1 | 5/1978 |
| DE | 20003305 U1 | 7/2000 |

OTHER PUBLICATIONS

Invitation to Pay Additional Fees for PCT/US2011/061183; Feb. 7, 2012; 6 pgs.

\* cited by examiner

*Primary Examiner* — Christopher M Koehler
(74) *Attorney, Agent, or Firm* — Gardner Groff Greenwald & Villanueva, PC

(57) ABSTRACT

A tire debris containment and wrapping system including a frame mountable to a vehicle or trailer. An engagement arm deploys a wrapping material that surrounds and contains the tire upon tire damage or imminent tire failure. The wrapping material prevents tire debris from separating from the tire and entering the roadway. An in-cab monitoring and alarm system is optionally provided to signal the operator of a tire failure.

8 Claims, 8 Drawing Sheets

SYSTEM AND METHOD FOR TIRE DEBRIS
CONTAINMENT

CROSS-REFERENCE TO RELATED APPLICATION

This application claims the benefit of U.S. Provisional Patent Application Ser. No. 61/415,131, filed Nov. 18, 2010, the entirety of which is hereby incorporated herein by reference.

TECHNICAL FIELD

The present invention relates generally to the field of transportation safety and environmental protection, and more particularly to a tire wrapping and tread debris containment system for a vehicle.

BACKGROUND

Maintaining clear roadways is an important aspect to vehicle safety and environmental protection. Most vehicles utilize inflatable rubber tires that may blow out or suffer from tread detachment. Resulting tire debris on the roadway (commonly referred to as "gators"), can present a danger to other vehicles. The debris is also unsightly litter, and can present environmental concerns. Large trucks are particularly prone to generating tire debris, due to the greater number of tires per vehicle, heavier loads, longer distances traveled, and tendency to use retread tires.

Accordingly, it has been found that needs exist for a system and method of collecting or containing debris from tires. It is to the provision of a system and method meeting these and other needs that the present invention is primarily directed.

SUMMARY

In example embodiments, the present invention provides a system and method for preventing tire debris from detaching from a vehicle while in use, and containing or collecting the debris so it is not left on the roadway. Example embodiments include a mechanism for wrapping and containing a damaged tire on a moving vehicle in the event the tire fails. In example forms, the mechanism includes a frame for mounting to a vehicle, a drum for housing a wrapping material to be encased around the damaged tire, a guide system mounted to the frame for selectively engaging the drum against the tire when tire failure occurs or is imminent, and a braking system housed within the drum to control the rate at which the wrapping material is unwound from the drum and wound onto the tire.

In one aspect, the invention relates to a containment system to prevent detachment of debris from a damaged tire. The containment system preferably includes a quantity of tire wrapping material, and an actuator for application of the tire wrapping material onto a tire.

In another aspect, the invention relates to a method of preventing tire debris from being dispersed from a tire. The method preferably includes the step of applying a debris containment material onto a tire upon damage to the tire.

In another aspect, the invention relates to a roll of tire debris containment material for use in connection with a containment system to prevent detachment of debris from a damaged tire, the tire having a tire circumference and a tire width. The roll of tire debris containment material preferably includes a sheet of flexible material having a sheet length at least sufficient to wrap around the tire circumference and a sheet width at least equal to the tire width.

In yet another aspect, the present invention relates to a vehicle tire containment and wrapping system. The system preferably includes a frame assembly mountable to a vehicle and having a movable guide system for engaging a tire. The system preferably also includes a breaking system mounted to the guide system for housing and selectively releasing a wrap material onto the tire.

In another aspect, the invention relates to a mechanism for catching and wrapping a deflated tire on a moving vehicle. The mechanism preferably includes a frame assembly for mounting to a vehicle, a guide system movably coupled to the frame for engaging the deflated tire, a drum movably coupled to the guide system and adapted to support a wrapping material, and a breaking system mounted within the drum for selectively allowing movement of the drum.

In still another aspect, the invention relates to a method of selectively containing a damaged tire on a moving vehicle to prevent loss of tire debris. The method preferably includes the steps of mounting a wrapping material to a vehicle, engaging a damaged tire with the wrapping material when tire failure occurs or is imminent, covering the perimeter of the tire with the wrapping material, and containing detached tread or other debris from the damaged tire within the wrapping material.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

DETAILED DESCRIPTION OF EXAMPLE EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1A:
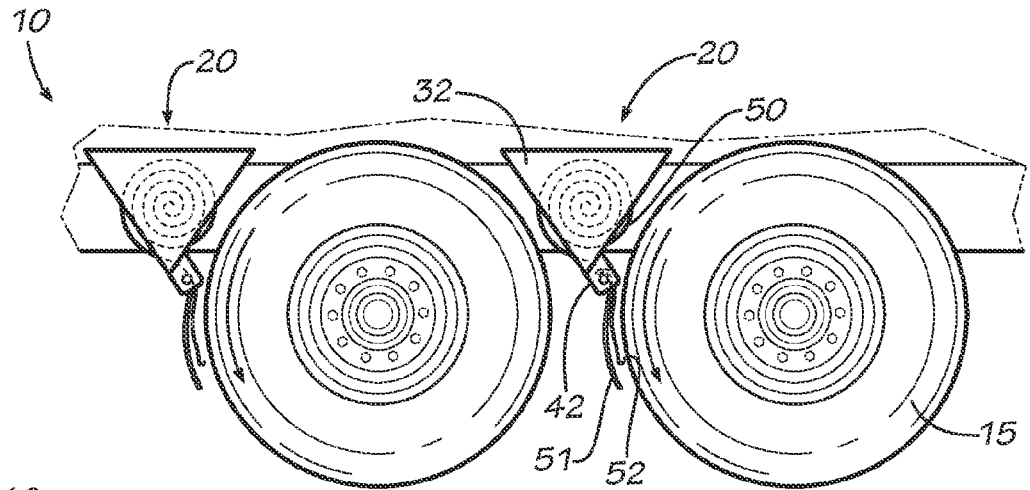
FIGS. 1A-1E show a sequence of operation of a tire containment and wrapping system according to an example embodiment of the present invention, progressing from an undeployed state, through further stages of deployment, to a fully deployed state.
Figure 1B:
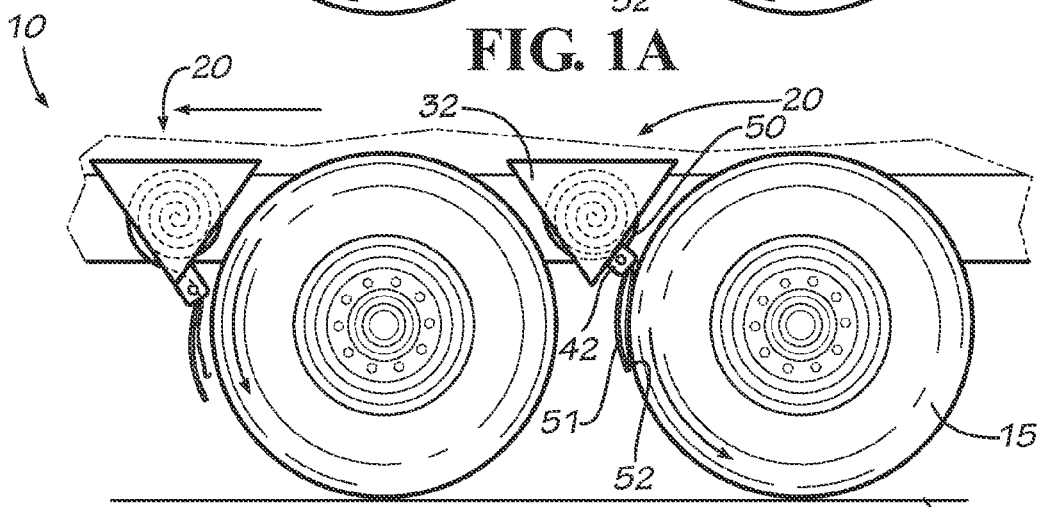
Figure 1C:
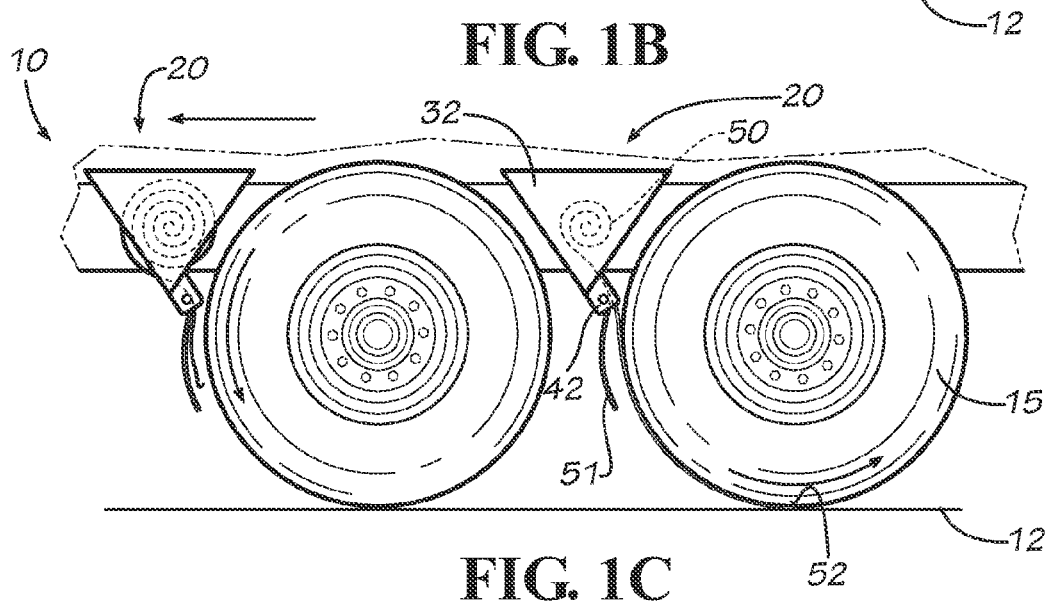
Figure 1D:
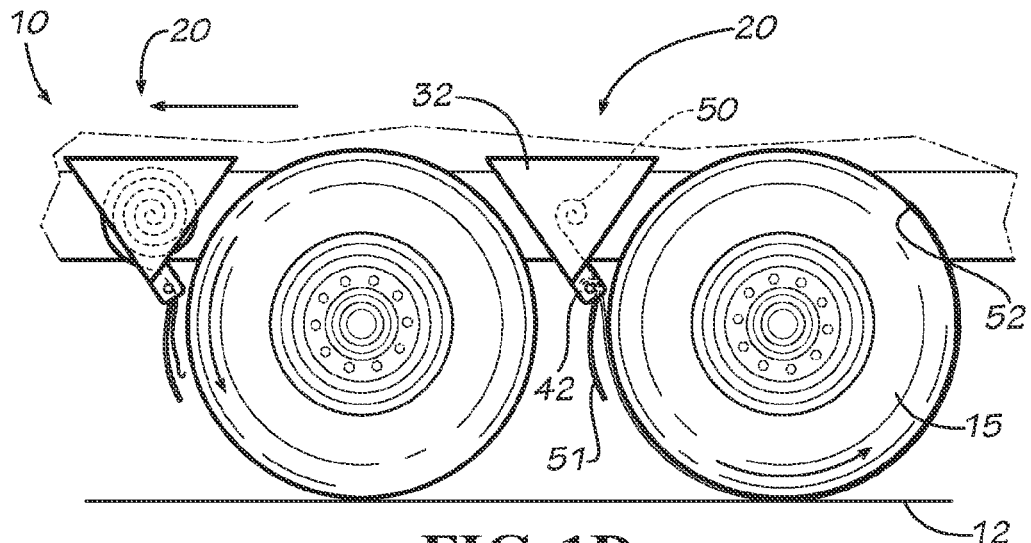
Figure 1E:
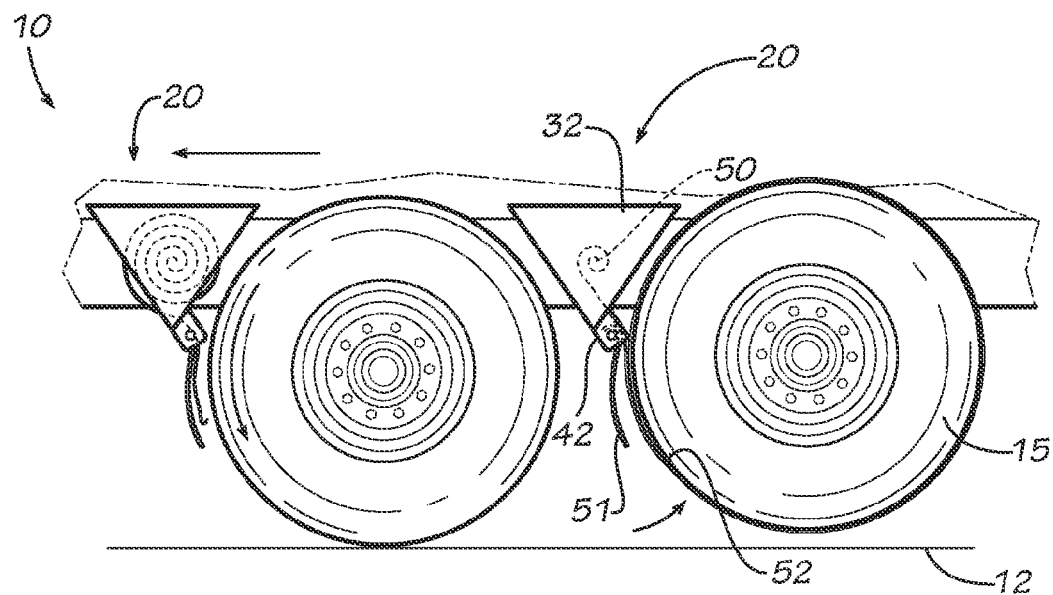
Figure 2A:
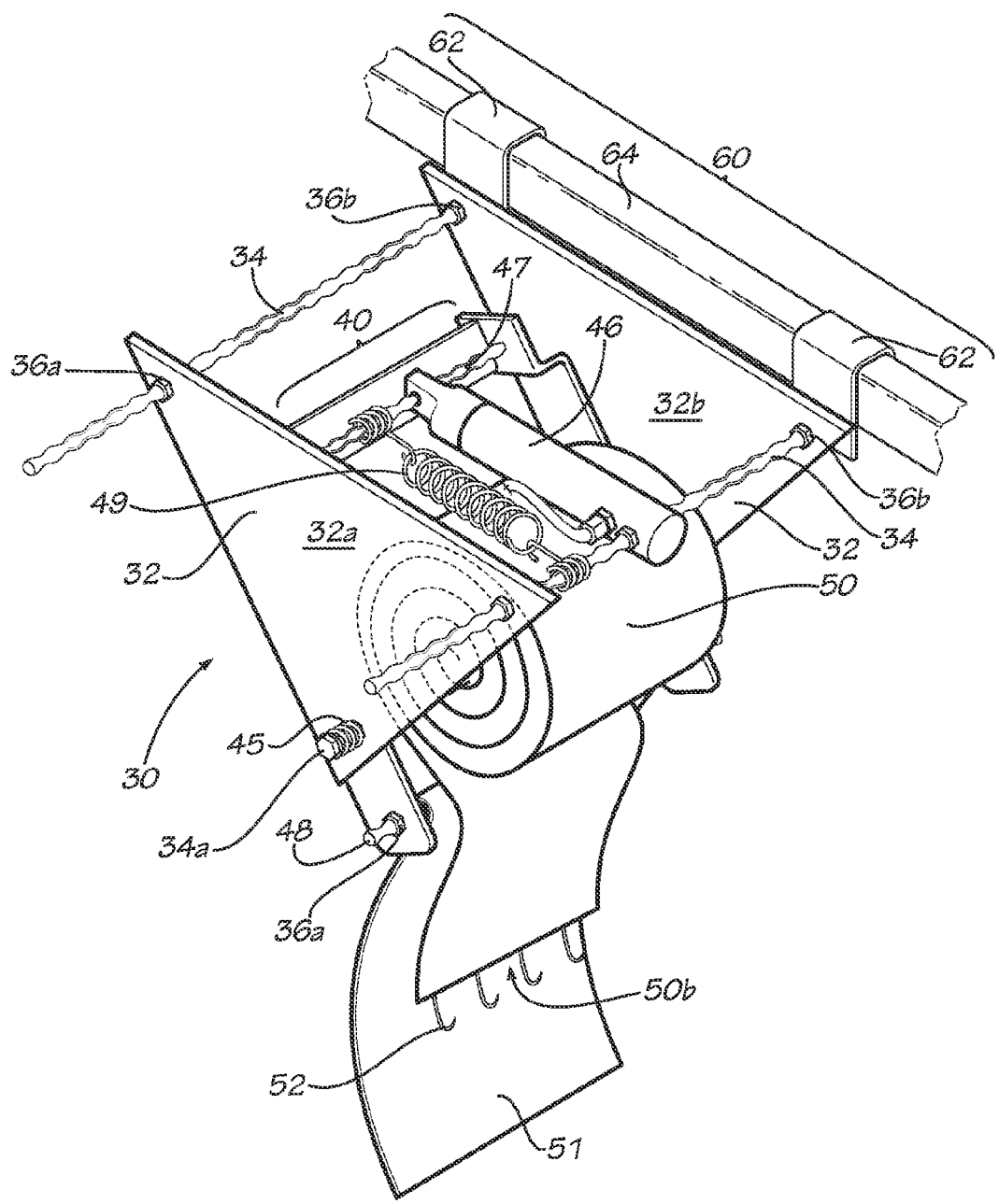
FIGS. 2A-2C show further details of the tire containment and wrapping system according to an example embodiment of the present invention.
Figure 2B:
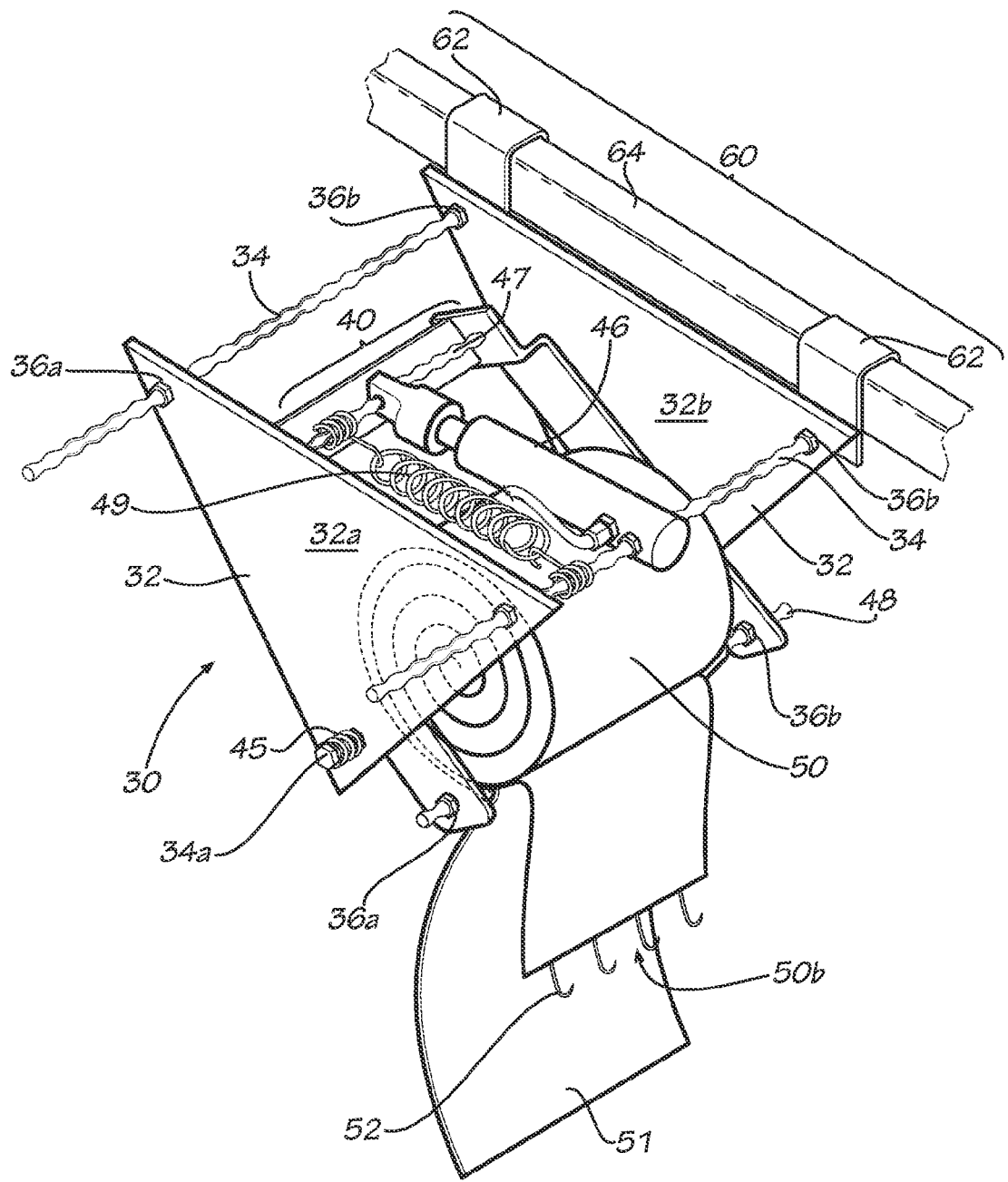
Figure 2C:
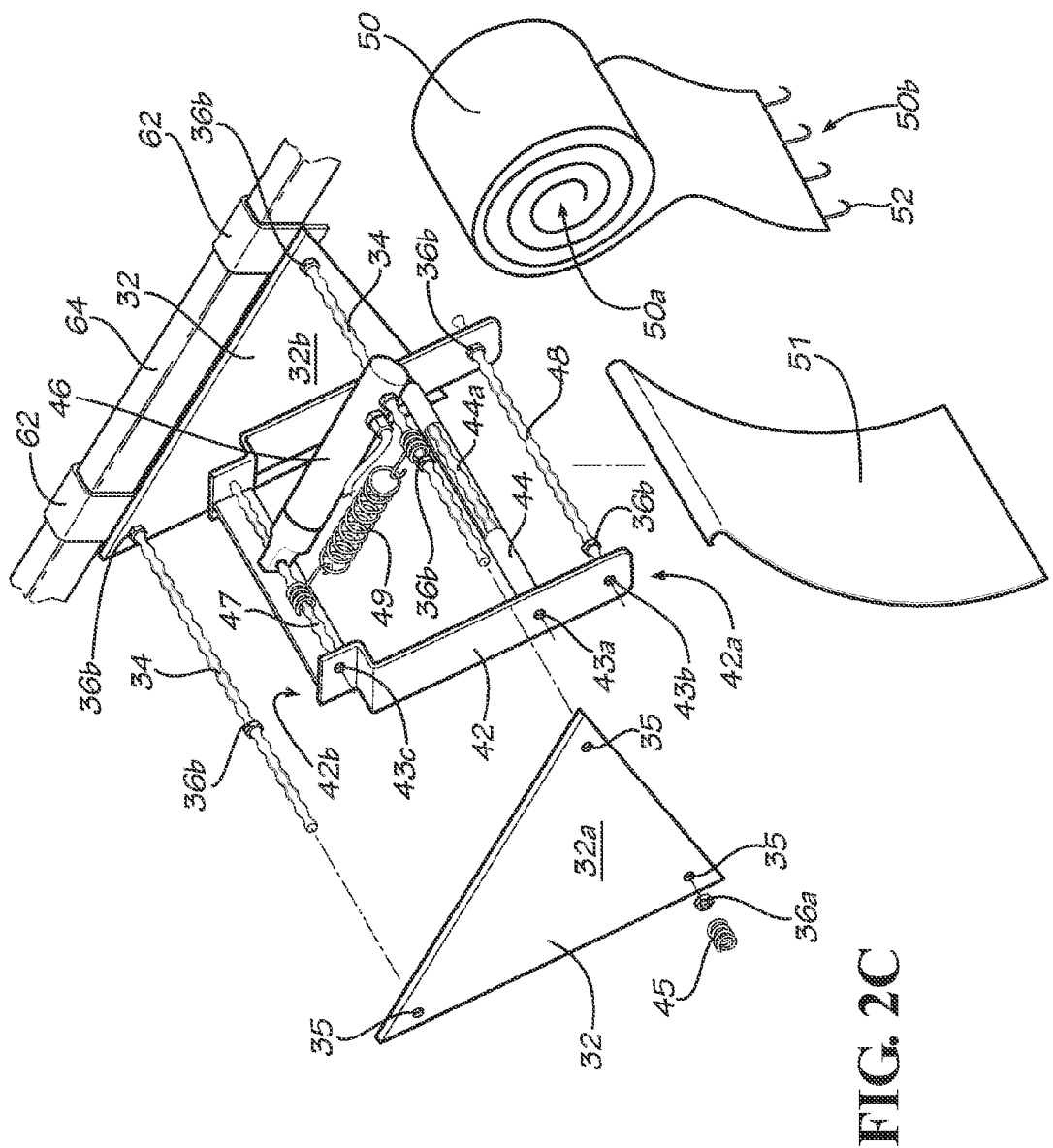
Figure 3:
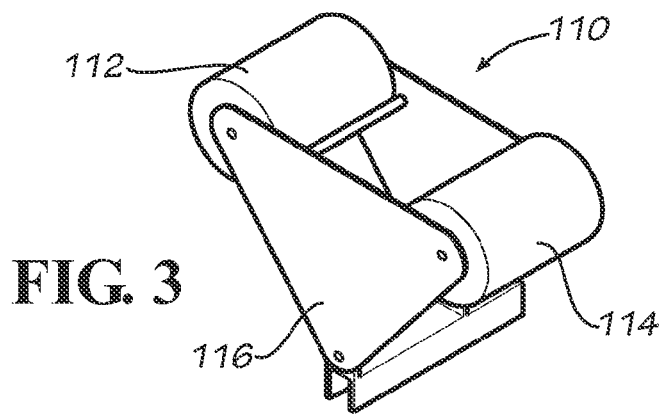
FIG. 3 shows a tire containment and wrapping system according to another example embodiment of the present invention.

With reference now to the drawing figures, wherein like reference numbers represent corresponding parts throughout the several views, FIGS. 1 and 2 show an example embodiment of a vehicle tire containment and wrapping system 20 according to the present invention. The vehicle tire containment and wrapping system 20 is mounted on a vehicle 10, such as a truck, trailer or automobile, proximal to an inflated tire 15. In general, the tire containment and wrapping system 20 comprises a frame or housing 30, a scoop or catch subsystem 40 for engaging a portion of the tire 15 upon sensing a failure and deploying the system, a mounting subsystem 60 for attachment to the vehicle 10, and a tire wrapping or tread containment material 50.

The housing 30 comprises two generally triangular plates 32 spaced parallel to one another and coupled together by connector rods 34. The connector rods 34 engage mounting holes 35 located proximal to the apices of the triangular plates 32. The connector rods 34 comprise connector nuts 36a abutting the triangular plate exterior portion 32a, and connector nuts 36b abutting the triangular plate interior portion 32b. The connector nuts 36a, 36b preferably have an internal thread to screw on the threaded connector rod 34. The spacing of the triangular plates generally depends of the width of the wrapping material but in example forms the housing is about 10.5 inches (10½") wide or more. Furthermore, the mounting holes 35 can be threaded for additional lateral support and maintaining the desired spacing of the triangular plates.

The scoop or catch subsystem 40 is pivotable on a connector rod 34a within the housing 30 for engaging the wrapping material 50 against a damaged tire 15b. In general, the scoop subsystem comprises two pivot engagement arms 42 having a planar first end 42a and an interiorly angled second end 42b, and an arcuate backer plate or scoop 51. The engagement arms 42 are spaced apart and abut the triangular plate interior portion 32b. The planar first end 42a extending beyond the housing comprises first end mounting holes 43b for coupling to an exterior arm connector rod 48. The interiorly angled second end 42b comprises second end mounting holes 43c for coupling to an interior arm connector rod 47. The interior and exterior arm connector rods 47, 48 are further secured to the first and second ends of the engagement arm 42 by connector nuts 36a, 36b. A central mounting hole 43a between the first and second ends of the arms 42 couples to the connector rod 34a for freely rotating the engagement arm between an undeployed position (see FIG. 2A) and a deployed position (see FIG. 2B).

The connector rod 34a further comprises a concentric elongated tubular brake axle 44. The brake axle 44 is freely rotatable within the engagement arms 42 that are abutting the triangular plate interior portion 32b. The brake axle 44 can be tensioned by a first and second brake axle spring 45 concentrically mounted between the triangular plate exterior portion and the connector nut 36a. A first end 50a of the wrapping material 50 is fixed to an adjustable plate or slot 44a on the brake axle 44 and fully wound. A second end 50b of the wrapping material freely hangs below the planar first end 42a and rests on the exterior arm connector rod 48. The second end of the wrapping material further comprises one or more engagement hooks 52 along the width of the material for attaching to the tire 15b in a deployed position. In both a deployed and undeployed position, the brake axle springs 45 can be adjusted to keep a constant tension on the wrapping material as it is being unwound and for preventing unintentional unwinding.

A pneumatic or hydraulic piston 46 or other fluid-driven, electromagnetic, motorized, or otherwise operated actuator functions to deploy the debris containment system. In the depicted embodiment, the actuator 46 and a biasing spring 49 connect the interior arm connector rod 47 to the fixed connector rod 34 of the housing 30. The actuator 46 is single-acting and forces the engagement arms 42 to rotate from an undeployed or ready position (FIG. 1A) to an activated or deployed position (FIG. 1B), causing the backer plate 51 to advance the hooked end 52 of the wrapping material 50 into engagement with the tire 15. When the piston 46 is no longer powered, the biasing spring 49 returns the engagement arms 42 to an undeployed position (FIG. 1C). In alternate embodiments, the single-acting piston and biasing spring can be replaced with a double-acting piston to advance and retract the mechanism. Continued rotation of the tire 15 unspools the wrap to contain or encapsulate the tire (FIGS. 1D-1E).

The mounting subsystem 60 of the tire containment and wrapping system 20 comprises two U-shaped brackets 62. Mounting holes 63 couple to one side of the two connector rods 34 that extend beyond the exterior portion of the triangular plate 32 and are further secured with connector nuts 36. A beam 64 slidably engages the brackets 62 that are coupled to the connector rods 34 and is mounted to a vehicle or trailer frame.

In operation, as depicted sequentially in FIGS. 1A-E, the tire containment and wrapping system 20 is deployed to wrap or otherwise contain or encapsulate a damaged tire to prevent detachment of tread "gators" or other tire debris upon tire failure. Optionally, the deployment system can be controlled based on the speed of the vehicle, for example allowing deployment when the vehicle is at or above a threshold speed, for example while the vehicle is moving at a velocity of at least 40 mph, and to not deploy below the threshold speed when tread detachment is less likely. In an undeployed state (FIG. 1A), the engagement arms 42 of the containment and wrapping system 20 rest in a first position adjacent to the tire 15. The hooked end 52 of the spooled wrapping material 50 is suspended from the engagement arm 42 without contacting the inflated tire 15a.

When a tire failure occurs or is imminent, the system is actuated (FIG. 1B) to deploy the wrapping or tread containment material to enshroud the damaged tire and prevent tire debris from detaching from the tire and onto the roadway. Hooks on the wrapping material embed in the tire material to engage and hold the wrapping material on the damaged tire, as the system is actuated. In alternate embodiments, the means for engaging the tread containment material onto a tire can comprise one or more hooks, pins, glue, clamps, adhesive, or other grasping and/or engaging features. In example embodiments, to actuate the system the pneumatic air piston 46 extends and rotates the pivot engagement arms 42 into a second position wherein the hooked end 52 of the wrapping material 50 contacts and engages the damaged tire 15. In alternate embodiments, the hooked end 52 of the wrapping material remains stationary, and tire tread comes into contact with and engages the hooked end as it separates from the tire. The damaged tire 15 continues its rotation and unwinds the spooled wrapping material 50 around the tire. The wrapping material 50 is kept in tension by the brake axle springs 45 as it unspools. As the point of hook engagement contacts the road 12, the hooks or other retention means are further secured to the tire 15 (FIG. 1C). FIG. 1D shows the wrapping material 50 continuing to wrap around the tire 15 as the tire continues to rotate. In a final contained state (FIG. 1E), the wrapping material 50 fully surrounds and suspends the tire 15b above the road 12.

The tire wrapping or tread containment material is optionally wound about a spool or other carrier, and may be removable and replaceable within the system. As such, the invention comprehends the containment system both with and without the spool of tread containment material installed therein, as well as original equipment or replacement spools or quantities of tread containment material apart from the remainder of the system. Depending upon the spool size, the sheet of tread containment material has a length sufficient surround the tire at least once, and optionally 2-10 times, and a width of at least the tire width and optionally 1½ to twice the tire width or more. In example forms, the tire wrapping or tread containment material comprises a quantity or length of plastic, rubber, Kevlar, polypropylene fabric, polyester fabric, tubular nylon fabric, nylon/silicon airbag fabric, vinyl coated polyester mesh, vinyl reinforced with polyester, LLDPE films, specialty high modulus fibers, woven, non-woven and/or other flexible sheet, strip or panel of material(s) in a single-ply or multi-ply configuration. In alternate embodiments, the tread containment material comprises a spray-on adhesive, fast curing polymer, resin, gum or other tread encapsulating or retaining substances that are sprayed or otherwise dispensed onto a tire when tire failure occurs or is imminent.

FIGS. 3-6 show tire debris containment systems according to several alternate embodiments of the invention. System 110, shown in FIG. 3 includes first and second rolls 112, 114 of tire wrapping or tread containment material mounted to a carrier bracket 116. Attachment of the carrier bracket 116 to a vehicle between adjacent tires or sets of tires, for example in a tandem wheeled trailer, allows actuation of the system to selectively or simultaneously apply tread containment material from the first roll 112 to a first tire and/or apply tread containment material from the second roll 114 to a second tire. Optionally, the carrier bracket may be translationally or pivotally mounted to the frame of the vehicle to allow the system to move between one tire or set of tires and another tire or set of tires, wherein by a single system may protect two, three, four or more tires.

Figure 4:
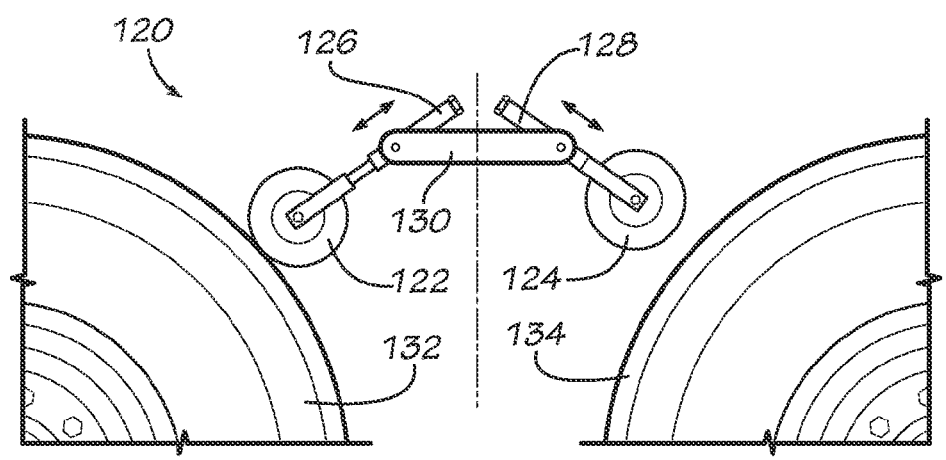
FIG. 4 shows a tire containment and wrapping system according to another example embodiment of the present invention.
Figure 5A:
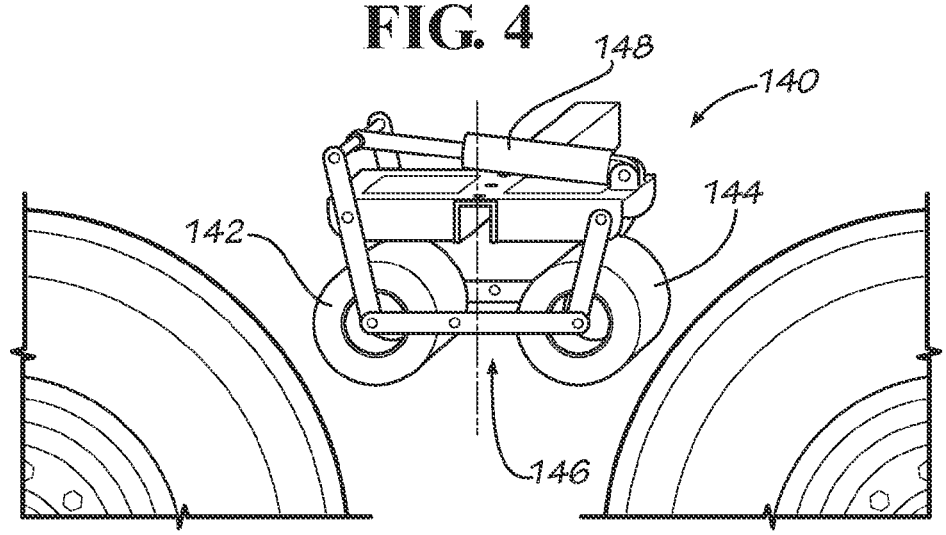
FIGS. 5A-5C show a tire containment and wrapping system according to another example embodiment of the present invention.
Figure 5B:
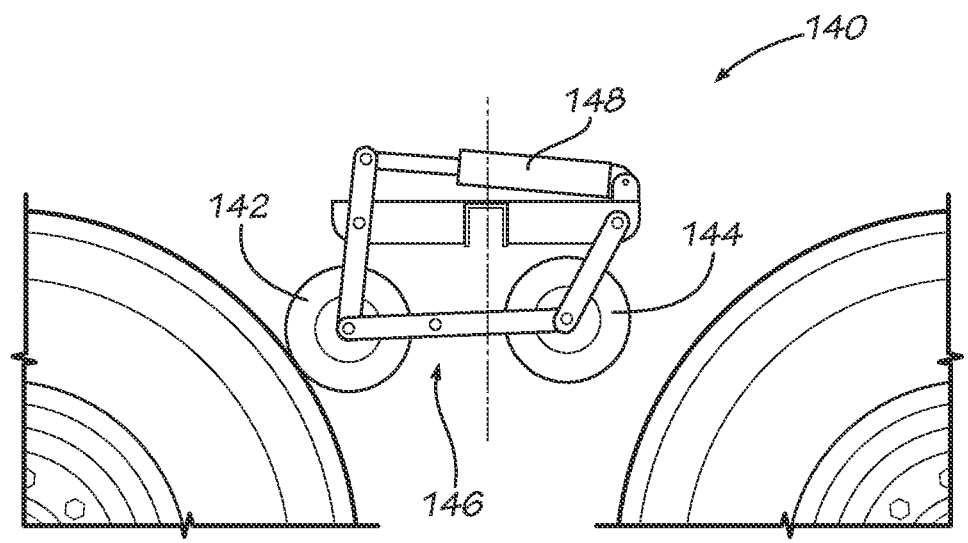
Figure 5C:
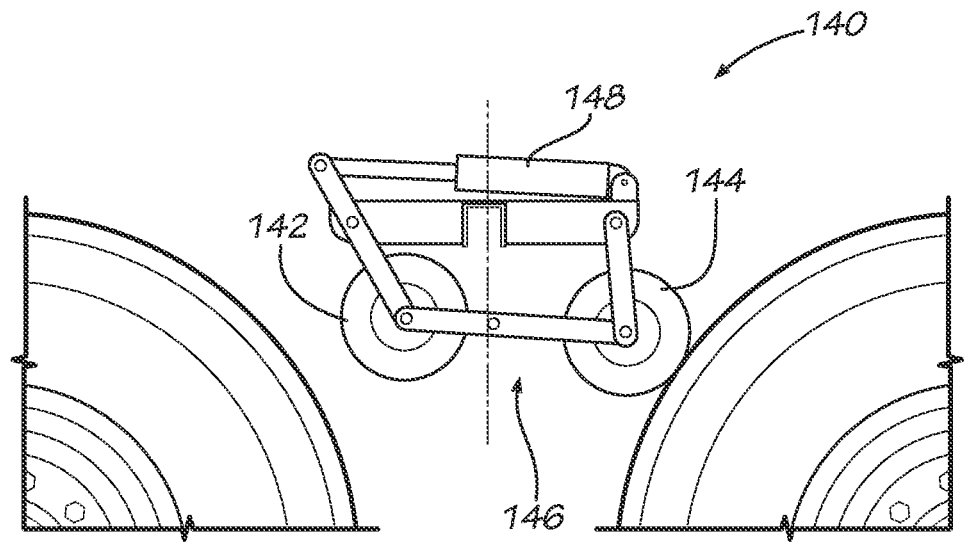

FIG. 4 shows another system 120 comprising a pair of rolls 122, 124 of tread containment material. Pneumatic or hydraulic fluid-driven actuators 126, 128 coupled to an intermediate linkage 130 optionally control deployment of one or both of the rolls onto tires 132, 134 under the control of an external control system. FIGS. 5A-5C show a similar system 140 having a pair of rolls 142, 144 of tread containment material carried by a four-bar linkage 146 actuated by actuator 148 to apply the tread containment material to one or more tires. In a partially extended state of the actuator, both rolls of tread containment material 142, 144 are in an undeployed position (FIG. 5A). Retraction of the actuator (FIG. 5B) deploys a first roll 142 into contact with a tire for deployment, and extension of the actuator (FIG. 5C) deploys the other roll 144 onto another tire.

Figure 6:
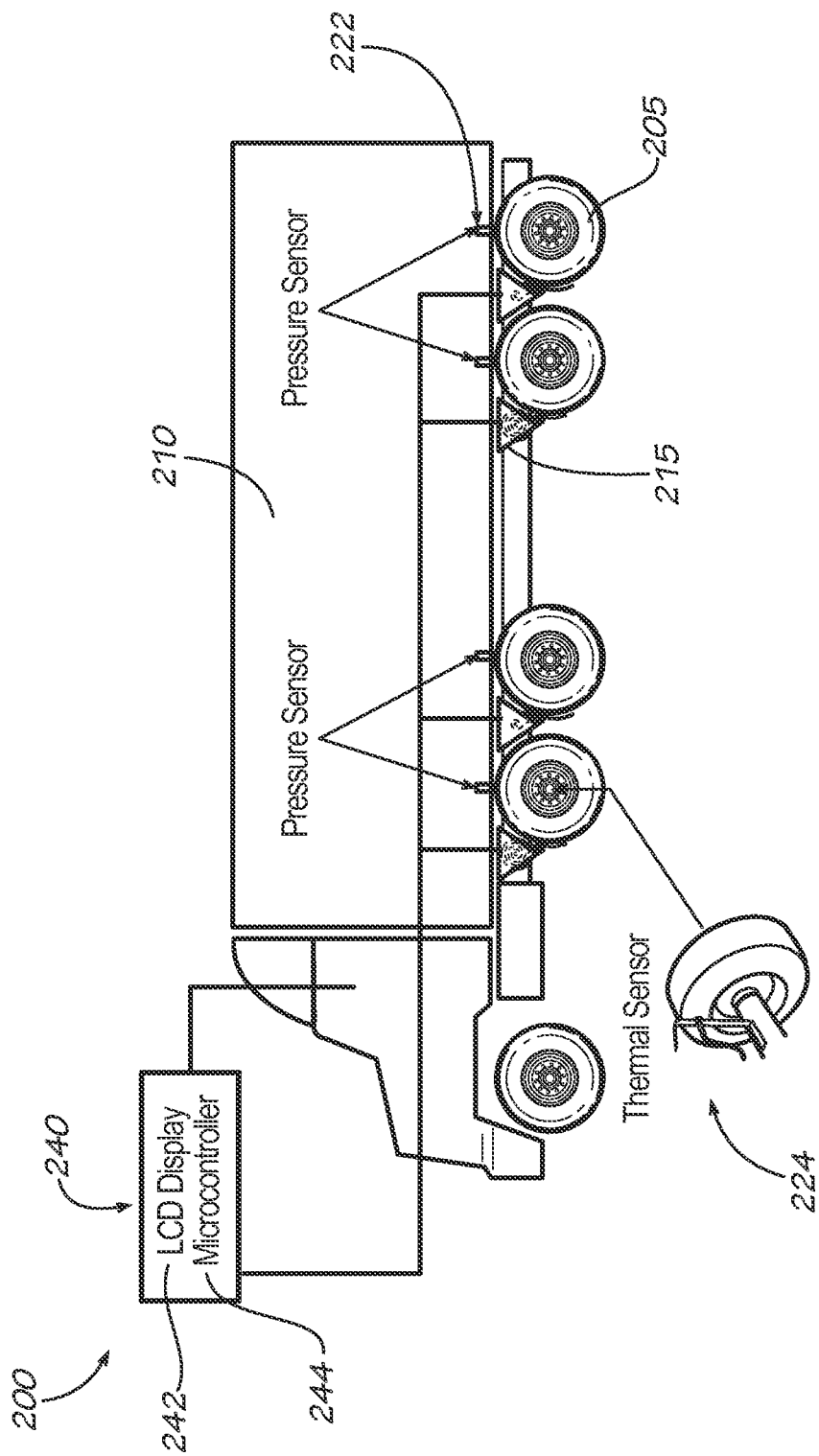
FIG. 6 shows a monitoring system for sensing imminent tire failure and controlling deployment of a tire containment and wrapping system according to another embodiment of the present invention.

The vehicle 10 optionally comprises a monitoring system 200 for actuating and controlling the tire wrapping debris containment system. FIG. 6 depicts the monitoring system 200 according to an example embodiment of the present invention. The monitoring system 200 actively and instantaneously measures the shape, temperature, and/or pressure of a tire 205. When the vehicle 210 reaches a threshold velocity of for example 40 mph, the sensor system 200 is activated. When a sensor measurement falls outside of set parameters, indicating a damaged tire, the containment and wrapping system 215 deploys to wrap the tire and prevent detachment of tire debris. In example forms, the monitoring system 200 comprises one or more sensors 220 on or adjacent the tire, and an in-cab interface 240 in the cab or driver's compartment of the vehicle. The sensors 220 actively measure critical properties of the tires 205 on a vehicle or trailer. The measurements from the sensors 220 are sent to the in-cab interface 240 by a hard-wire or wireless connection, for example by using Bluetooth. The in-cab interface 240 optionally comprises a display 242 and a microcontroller, processor or computer system 244 to analyze, receive, and display the measurements. The microcontroller 244 has programmable settings to adjust the allowable parameters or criteria for each sensor 220, for example a particular tire specification may provide an alert temperature of 180° F. and a deployment temperature of 220° F. When one or more of the sensor measurements is determined to fall outside of the set parameters, the microcontroller 244 signals the tire containment and wrapping system 215 to deploy, The in-cab interface 240 signals an alarm or otherwise displays that the tire containment and wrapping system 215 has deployed. Example sensors include an RPM sensor for measuring tire rotation speed, a proximity sensor (for example Electrotap T300A Infrared Distance Sensor) for measuring a distance indicating tread separation from the tire or an out-of-round tire, a temperature sensor 224 (Omega® OS136 Infrared) for measuring tire temperature, and/or a pressure sensor 222 (for example TYREDOG® TD-2000A) for measuring tire inflation pressure. In example embodiments, one or more sensors monitor each tire on a trailer or other vehicle and are in electronic communication with a common shared transmitter, which in turn communicates with the in-cab display and alarm; or alternatively each sensor separately communicates a signal to a central control and display system.

While the invention has been described with reference to preferred and example embodiments, it will be understood by those skilled in the art that a variety of modifications, additions and deletions are within the scope of the invention, as defined by the following claims.

What is claimed is:

1. A method of preventing tire tread debris from being dispersed from a rolling tire of a vehicle, said method comprising automatically actuating a containment system upon tire damage that may result in the detachment of tire tread from the rolling tire to apply a debris containment material onto the rolling tire without stopping the vehicle to contain tire tread debris separating from the rolling tire.

2. The method of claim 1, wherein the step of applying a debris containment material onto the tire comprises unrolling a roll of the debris containment material and wrapping the debris containment material about at least a portion of the tire.

3. The method of claim 1, wherein the debris containment material is applied to the tire by engagement of a hooked portion of the debris containment material onto the tire.

4. The method of claim 1, wherein the debris containment material is applied to the tire by engagement of the debris containment material against the tire.

5. The method of claim 1, further comprising monitoring for damage to the tire and applying the debris containment material onto the tire upon indication of damage to the tire.

6. The method of claim 5, wherein the monitoring for damage to the tire comprises operation of a sensor selected from a pressure sensor, a temperature sensor, a proximity sensor and a speed sensor.

7. The method of claim 1, further comprising signaling an alarm upon application of the debris containment material onto the tire.

8. The method of claim 1, further comprising operation of a deployment mechanism to selectively apply the debris containment material onto at least one tire selected from a plurality of tires on a vehicle.

* * * * *